United States Patent [19]

El-Ibiary et al.

[11] Patent Number: 4,651,272
[45] Date of Patent: Mar. 17, 1987

[54] POWER TRANSMISSION

[75] Inventors: Yehia M. El-Ibiary; Richard S. Leemhuis, both of Troy, Mich.

[73] Assignee: Vickers, Incorporated, Troy, Mich.

[21] Appl. No.: 740,481

[22] Filed: Jun. 3, 1985

[51] Int. Cl.⁴ .............................................. G05B 13/02
[52] U.S. Cl. .................................... 364/176; 318/632; 318/636; 364/178; 364/183; 364/165; 364/553
[58] Field of Search ............................. 364/148–151, 364/157, 174, 176, 177, 178, 179, 183, 553, 165; 318/561, 632, 636, 611

[56] References Cited

U.S. PATENT DOCUMENTS

| 4,338,659 | 7/1982 | Kurakake | 364/176 X |
| 4,396,975 | 8/1983 | Kurakake | 364/174 X |
| 4,577,271 | 3/1986 | Jones et al. | 364/176 X |
| 4,581,699 | 4/1986 | Delmege et al. | 364/174 |

Primary Examiner—Joseph Ruggiero
Attorney, Agent, or Firm—Barnes, Kisselle, Raisch, Choate, Whittemore & Hulbert

[57] ABSTRACT

A power servo system which includes an actuator coupled to a load and receives an input command signal indicative of desired motion at the load. A sampled-data control system receives and samples input signals indicative of desired and actual motion at the hydraulic actuator and load, and provides control signals to the actuator necessary to obtain desired motion. The sampled-data control system includes digital processing circuitry with series and feedback compensation, coordinated with the hydraulic system transfer function, to form a complete closed-loop control system operating in the sampled-data or Z-transform domain. Different equation constants in the series and feedback compensation circuitry are recalculated periodically. In one embodiment of the invention, such constants are recalculated as a function of system behavior, so that system control automatically varies with operating conditions. In another embodiment of the invention, system constants are calculated based upon a single operator-variable (or remote system) input, which accommodates rapid operator-implemented tracking of system behavior while reducing calculation time.

18 Claims, 7 Drawing Figures

POWER TRANSMISSION

The present invention relates to power transmissions, and more particularly to power servo control systems, e.g. electric, electropneumatic and/or electrohydraulic servo control systems.

BACKGROUND OF THE INVENTION

It is conventional practice in the art of electrohydraulic servo control systems to provide a command signal indicative of position, velocity, acceleration or pressure desired at the controlled mechanism, to measure actual position, velocity and acceleration at the controlled mechanism by means of corresponding transducers, and to drive a hydraulic actuator with an error signal representative of a difference between the command signal and the measured motion variables. Provision of three transducers mounted on or otherwise responsive to the controlled mechanism increases significantly the overall expense of the servo system while at the same time reducing overall reliability. The aforementioned deficiencies are particularly acute in the field of industrial robotics where interest in cost, simplicity and reliability is continually increasing.

U.S. patent application Ser. No. 418,086, filed Sept. 14, 1982 and assigned to the assignee hereof, now U.S. Pat. No. 4,502,109, discloses an electrohydraulic servo control system having three dynamic state variables, namely position, velocity and acceleration. A control system includes a sensor coupled to the hydraulic actuator for measuring load position, and a digital observer responsive to measured position for estimating velocity and acceleration. Signals indicative of measured and/or estimated state variables are compared with an input state command signal to obtain a difference of error signal which drives the actuator. The observer electronics includes a digital microprocessor suitably programmed to estimate the state variables as solutions to corresponding linear equations. The several equation constants, which are functions of actuator and driven mass characteristics, are entered through a corresponding multiplicity of operator-adjustable resistors. U.S. patent application Ser. No. 699,039, filed Feb. 7, 1985, now U.S. Pat. No. 4,581,699, as a continuation-in-part of Ser. No. 418,086, and likewise assigned to the assignee hereof, discloses a modification to the parent disclosure wherein the several equation constants are down-loaded from a remote system into observer storage registers.

Although the technology disclosed in the above-referenced patent applications presents a significant step forward in the art, improvement remains desirable in a number of areas. For example, the need to calculate the several state variables as solutions to a corresponding number of equations at each input sampling interval is quite time consuming, placing limitations on speed of operation and the number of tasks that can be performed. Furthermore, the requirement that system constants be loaded into the observer system limits adaptability of the system for changing conditions, such as wear or hydraulic fluid pressure variation.

OBJECTS AND SUMMARY OF THE INVENTION

A general object of the present invention, therefore, is to provide a servo control system which is self-adaptive in operation, i.e. which periodically updates some or all system constants to accommodate changing conditions, and which is configured to obtain improved speed of calculation.

Another object of the invention is to provide a servo control system which obtains the foregoing objectives, and yet remains economical and reliable to implement.

The present application discloses sampled-data feedback control systems wherein control is obtained by sampling the various control and error signals at discrete periodic intervals. Sampled-data control systems of this character are to be distinguished from continuous analog control systems. For purposes of disclosure and description, it is convenient to consider construction and operation of the sampled-data feedback control systems of the invention in the so-called sampled-data or Z-transform domain. In systems of the subject type, which may be described by linear difference equations with constants that do not vary significantly between sample intervals, Z transformation of system transfer functions yields rational polynomial ratios in the variable "Z". This variable is complex and is related to the more-recognized Laplace transform variable "S" by the equation $$Z = e^{TS} \tag{1}$$

where T is sampling interval. Indeed, in Z-transform theory, such concepts as transfer functions, mapping theorems, combinatorial theorems and inversions are related to sampled-data systems in a manner in many ways comparable to the relationship of the Laplace transformation to continuous systems. A more complete discussion of sampled-data control systems and Z-transform theory is provided in Ragazzini and Franklin, *Sampled-Data Control Systems*, Mc-Graw-Hill (1958).

In accordance with the embodiments of the invention herein disclosed, a sampled-data control system receives and samples input signals indicative of desired and actual motion at a hydraulic actuator and load, and provides control signals to the actuator necessary to obtain desired motion. The sampled-data control system includes digital processing circuitry with series and feedback compensation, coordinated with hydraulic system behavior function, to form a complete closed-loop control system operating in the sampled-data or Z-transform domain. Difference equation constants in the series and feedback compensation circuitry are recalculated at each sampling interval. In one embodiment of the invention, such constants are recalculated as a function of system behavior, so that system control automatically varies with operating conditions or load. In another embodiment of the invention, system constants are calculated based upon a single operator-variable (or remote system) input, which accommodates rapid operator-implemented tracking of system behavior while reducing calculation time.

BRIEF DESCRIPTION OF THE DRAWINGS

The invention, together with additional objects, features and advantages thereof, will be best understood from the following description, the appended claims and the accompanying drawings in which:

FIG. 1 illustrates a conventional position command electrohydraulic servo control system 10 as comprising a valve actuator system or plant 12, which includes an electrohydraulic valve coupled by an actuator to a load. The actuator system, including the load, is characterized by an inertial mass and spring elasticity. A position sensor or transducer 14 is suitably mechanically coupled to the actuator and load to provide an electrical output signal Y as a function of actual actuator and load position. A position command or reference signal R from an operator joystick 15, for example, is fed to a summer 16, which provides an error signal E as a function of the difference between the command signal R and the actual position signal Y. The error signal E, fed through a suitable amplifier having gain 18, controls operation of actuator 12. It will be appreciated that summer 16 and gain 18 would typically be combined in a single amplifier. System 12 and transducer 14 may be of any suitable types, and indeed may be contained within a single assembly.

FIG. 2 illustrates an electrohydraulic servo control system 20 embodying a sampled-data digital controller 22 in accordance with the present invention. Within controller 22, a first sample-and-hold circuit 24 receives and samples command signal R from joystick 15, and provides a corresponding Z-transformed output signal R(Z) in the sampled-data domain. A second sample-and-hold circuit 26 receives and samples position signal Y from sensor 14, and provides a corresponding Z-transformed output signal Y(Z) in the sampled-data domain. A feedback compensator 28 receives the output Y(Z) of circuit 26 and provides a compensation signal Q(Z) to one input of a summer 30. Summer 30 receives a second input R(Z) from circuit 24, and provides a difference or error signal E(Z) to a series compensator 32. Compensator 32 provides a command signal U(Z) through a zero-order-hold circuit 33 to plant 12.

Figure 1:
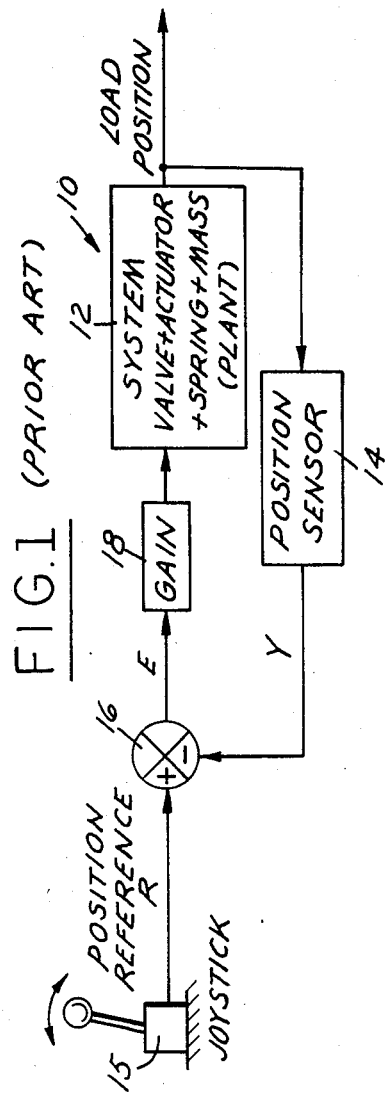
FIG. 1 is a functional block diagram of a basic electrohydraulic servo control system in accordance with the prior art.

For an electrohydraulic plant 12, including a hydraulic valve, actuator and spring, it can be shown that the transfer function of plant 12 in the sampled-data domain is:

$$\frac{B_1 Z^2 + B_2 Z + B_3}{Z^3 + \alpha_1 Z^2 + \alpha_2 Z + \alpha_3} \quad (2)$$

where $B_1$, $B_2$, $B_3$, $\alpha_1$, $\alpha_2$ and $\alpha_3$ are constant functions of plant parameters and sampling time. Assuming zero damping, expression (2) reduces to:

$$\frac{B_1 Z^2 + B_2 Z + B_1}{Z^3 - \alpha Z^2 + \alpha Z - 1} \quad (3)$$

$B_1$, $B_2$ and $\alpha$ are given by the equations:

$$\alpha = 2\cos\omega T + 1 \quad (4)$$

$$B_1 = K_5 \left( T - \frac{\sin\omega T}{\omega} \right) \quad (5)$$

$$B_2 = 2K_5 \left( \frac{\sin\omega T}{\omega} - T\cos\omega T \right) \quad (6)$$

where $K_5$ is a gain constant, T is sampling period and $\omega$ is neutral stability resonant frequency of plant 12. All of these constants are measurable or estimatable in accordance with preferred aspects of the invention to be discussed. The transfer function of system or plant 12 is thus predetermined as a function of plant characteristics.

The orders of the Z-domain transfer functions of compensators 28, 32 are selected to obtain desired step response and computation time. In a preferred embodiment of the invention, the transfer function of compensator 28 is:

$$Q(Z) = \frac{(G_1 Z^2 + G_2 Z + G_3)}{P(Z)} Y(Z) \quad (7)$$

and the transfer function of compensator 32 is:

$$U(Z) = \left[ \frac{P(Z)}{Z^3 + C_1 Z^2 + C_2 Z + C_3} \right] E(Z) \quad (8)$$

where $G_1$, $G_2$, $G_3$, $C_1$, $C_2$ and $C_3$ are constants, and P(Z) is a polynomial in Z which, in the preferred embodiments of the invention hereinafter discussed, is set equal to unity. First and second order polynomials for the transfer function of compensator 32 are also contemplated. Thus, in the general case, where the transfer function of plant 12 is of order N in the Z-domain, with N being an integer greater than one, the transfer function of compensator 28 is of order $N-1$, and the transfer function of compensator 32 is N or less (i.e., not greater than N).

For the overall system to be stable, including plant 12 and controller 22, all poles must be within the Z-plane unit circle. Ragazzini and Franklin, supra et ch. 4. The overall closed-loop transfer function, embodying the individual functions of expressions (3), (7) and (8), is a sixth order expression in Z. Thus, six poles are needed. Choosing all six poles at location $-a$ within the Z-plane unit circle means that $$(z - e^{-aT})^6 = Z^6 6e^{-aT} Z^5 + 15e^{-2aT} Z^4 - 20e^{-3aT} Z^3 + \quad (9)$$

$$15e^{+4aT} Z^2 - 6e^{-5aT} Z + e^{-6aT}$$

Combining expressions (2), (6) and (7), and equating coefficients with corresponding coefficients in equation (8), yields:

$$C_1 = \alpha - 6e^{-aT} \quad (10)$$

-continued $$\begin{bmatrix} 0 & 0 & B_1 & 0 & -1 \\ 0 & B_1 & B_2 & -1 & \alpha \\ B_1 & B_2 & B_1 & \alpha & -\alpha \\ B_2 & B_1 & 0 & -\alpha & 1 \\ B_1 & 0 & 0 & 1 & 0 \end{bmatrix} \begin{bmatrix} G_1 \\ G_2 \\ G_3 \\ C_2 \\ C_3 \end{bmatrix} =$$

$$\begin{bmatrix} e^{-6aT} \\ -6e^{-5aT} \\ \alpha - 6e^{-aT} + 15e^{-4aT} \\ 1 - \alpha^2 + 6\alpha e^{-aT} - 20e^{-3aT} \\ \alpha^2 - 6\alpha e^{-aT} - \alpha + 15e^{-2aT} \end{bmatrix}$$

For a given value of pole location $-a$, and values of constants $B_1$, $B_2$ and $\alpha$ per equations (4)–(6), equation (10) can be solved for constants $G_1$, $G_2$, $G_3$, $C_1$, $C_2$, $C_3$.

Figure 2:
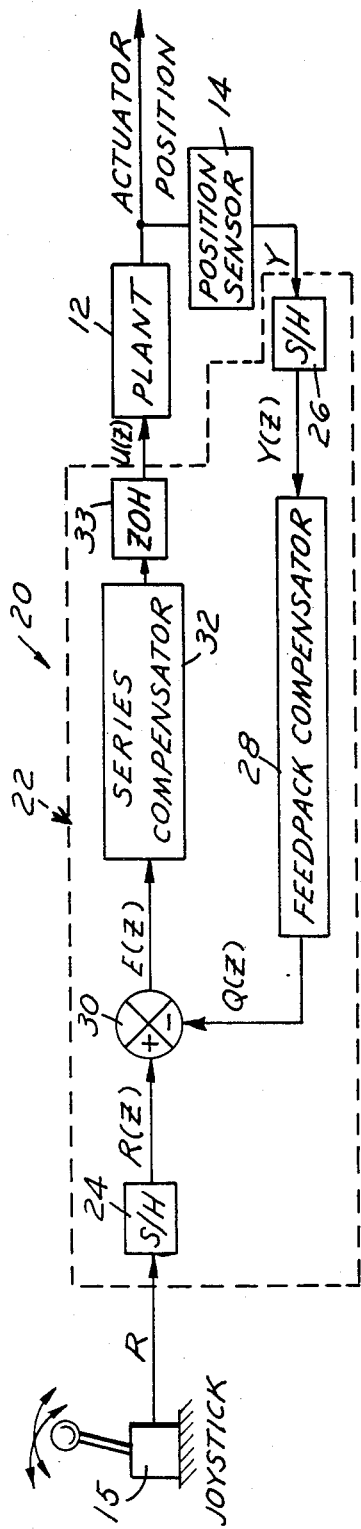
FIG. 2 is a functional block diagram of a basic hydraulic control system in accordance with the present invention.
Figure 3:
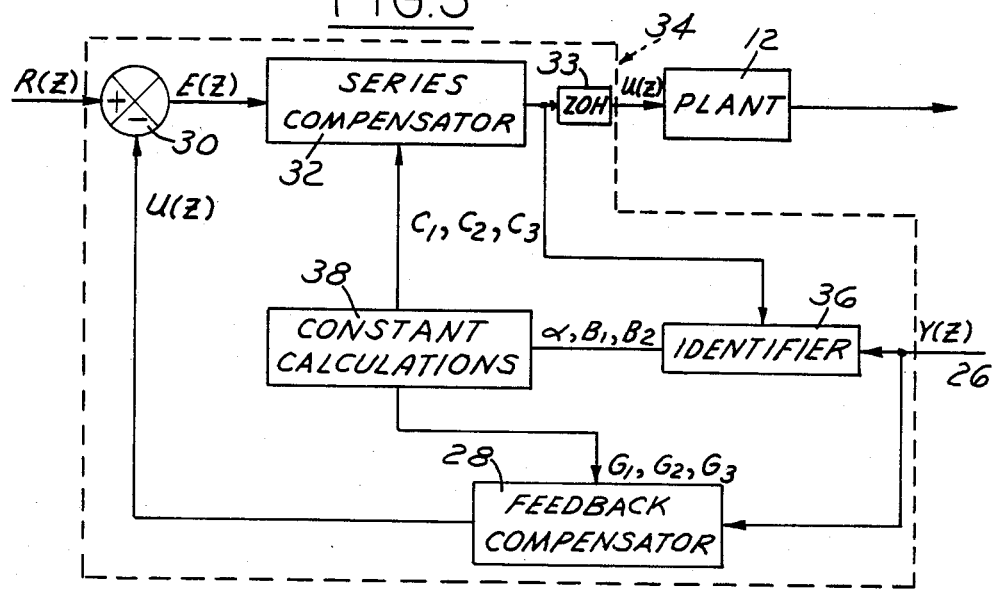
FIG. 3 is a more detailed functional block diagram of the sampled-data digital controller in FIG. 2 in accordance with one embodiment of the invention.

FIG. 3 illustrates a modified controller 34 wherein the constants $\alpha$, $B_1$ and $B_2$ are continuously estimated and updated based upon system performance, and the internal transfer function constants $C_1,C_2, C_3$ and $G_1,G_2,G_3$ are likesise updated to obtain desired performance. In FIG. 3, an identifier 36 receives the Z-transformed position output $Y(Z)$ of circuit 26 (FIG. 2) and the Z-domain command signal $U(Z)$ from compensator 32. Identifier 32 estimates constants $\alpha,B_1$ and $B_2$ as will be described, and feeds such estimated constants to the circuit block 38 wherein constants $C_1,C_2,C_3$ and $G_1,G_2,G_3$ are calculated per equation (10). The latter constants are then fed to associated compensators 32,28.

Briefly stated, identifier 36 estimates constants $\alpha,B_1$ and $B_2$ periodically as a function of command signal $U(Z)$ and system response $Y(Z)$ thereto over a number of preceding intervals corresponding to the order of the system. More specifically, at sample time (KT-2T), the discrete equation of plant 12 is:

$$Y_{k-2} - \alpha Y_{k-3} + \alpha Y_{k-4} - Y_{k-5} = B_1 U_{k-3} + B_2 U_{k-4} + B_1 U_{k-5} \quad (11)$$

At time (KT-T), such equation is:

$$Y_{k-1} - \alpha Y_{k-2} + \alpha Y_{k-3} - Y_{k-4} = B_1 U_{k-2} + B_2 U_{k-3} + B_1 U_{k-4} \quad (12)$$

And at time (kT):

$$Y_k - \alpha Y_{k-1} + \alpha Y_{k-2} - Y_{k-3} = B_1 U_{k-1} + B_2 U_{k-2} + B_1 U_{k-3} \quad (13)$$

Equations (11)–(13) may be combined and rearranged as follows:

$$\begin{bmatrix} (Y_{k-4} - Y_{k-3}) & -(U_{k-3} + U_{k-5}) & -U_{k-4} \\ (Y_{k-3} - Y_{k-2}) & -(U_{k-2} + U_{k-4}) & -U_{k-3} \\ (Y_{k-2} - Y_{k-1}) & -(U_{k-1} + U_{k-3}) & -U_{k-2} \end{bmatrix} \begin{bmatrix} \alpha \\ B_1 \\ B_2 \end{bmatrix} = \begin{bmatrix} Y_{k-5} - Y_{k-2} \\ Y_{k-4} - Y_{k-1} \\ Y_{k-3} - Y_k \end{bmatrix} \quad (14)$$

The values of $Y(Z)$ and $U(Z)$ are physically sampled and stored over the required number of intervals, i.e. six for a third order plant, and constants, $\alpha$, $B_1$ and $B_2$ are estimated accordingly per equation (14).

Estimation of constants $\alpha$, $B_1$ and $B_2$ per equation (14) has been found to be more time-consuming than desirable for real-time control applications. It will be noted from equations (4)–(6) that $B_1$ and $B_2$ can be determined from $\alpha$ based upon the common factor $\omega$. In accordance with a modification to be discussed, identifier 36 (FIG. 3) first estimates $\alpha$, and then estimates $B_1$ and $B_2$ from $\alpha$. However, such computation based upon equations (4)–(6) involving trigometric functions would be too time consuming. Accordingly, equations (4)–(6) are first rewritten using Taylor series expansion, and neglecting higher-order terms, as follows:

$$\alpha = 3 - (\omega T)^2 \left[ 1 - \frac{(\omega T)^2}{12} \right] \quad (15)$$

$$B_1 = \frac{\omega^2 T^3}{G} \left[ 1 - \frac{(\omega T)^2}{20} \right] \quad (16)$$

$$B_2 = \frac{2\omega^2 T^3}{3} \left[ 1 - \frac{(\omega T)^2}{10} \right] \quad (17)$$

Defining $(\omega T)^2$ as Y, and solving equation (15) for Y yields $$Y = 6 \pm 2(3\alpha)^{\frac{1}{2}} \quad (18)$$

The positive sign yields a trivial solution and is ignored. The result:

$$B_1 = \frac{TY}{6} \left( 1 - \frac{Y}{20} \right) \quad (19)$$

$$B_2 = \frac{2TY}{3} \left( 1 - \frac{Y}{10} \right) \quad (20)$$

Thus, constant $\alpha$ is determined per equation (14), and constants $B_1$ and $B_2$ are determined per equations (18)–(20). It has been found, somewhat surprisingly, using the specific embodiment of FIG. 7 (to be described), that estimation of $B_1$ and $B_2$ per equations (18)–(20) is not only faster than solution of equation (14) for $\alpha$, $B_1$ and $B_2$, but is also more accurate.

Figure 4:
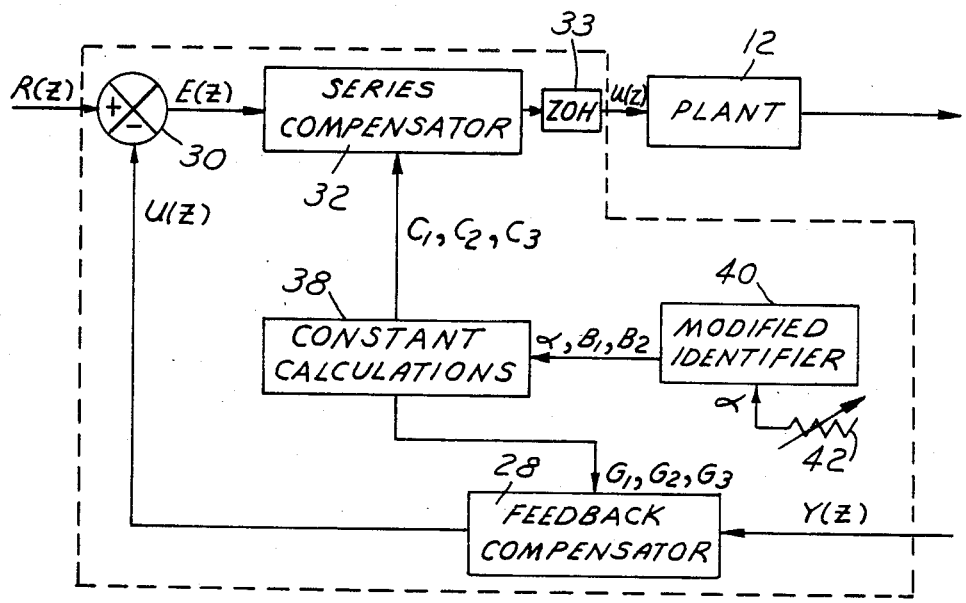
FIG. 4 is a detailed functional block diagram of the sampled-data digital controller of FIG. 2 in accordance with a second embodiment of the invention.

FIG. 4 illustrates a modification to FIG. 3 wherein a modified identifier 40 receives a single input indicative of constant $\alpha$ from an adjustable resistor 42. Constants $B_1,B_2$ are calculated per equations (18)–(20). This modification is thus semi-automatic in that all system constants are derived from a single operator-adjustable input. It will be appreciated that the $\alpha$-indicating input to identifier 40 could also be fed from a remotely located control system or the like. The modification of FIG. 4 has the advantage of eliminating the time consuming solution for from matrix equation (14).

Figure 6:
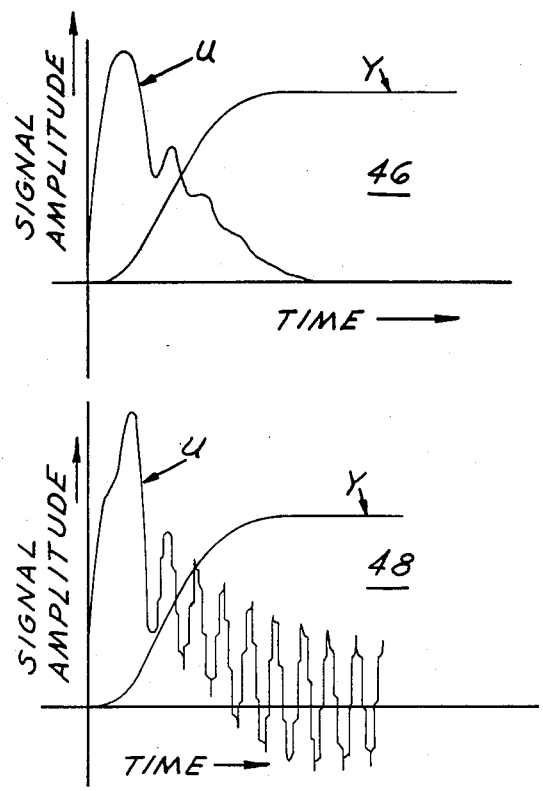
FIG. 6 is a graphic illustration of operation of a further embodiment of the invention.
Figure 5:
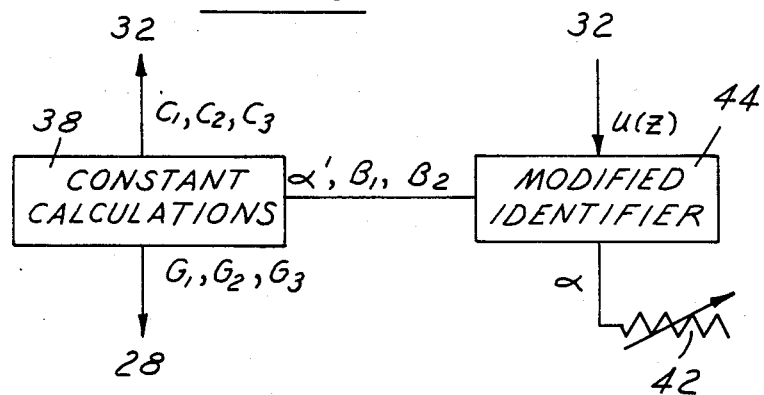
FIG. 5 is a fragmentary block diagram illustrating a further embodiment of the invention.

The embodiment of FIG. 4 may be made semi-adaptive by means of the modification of FIG. 5 wherein the modified identifier 44 additionally receives an input $U(Z)$ from compensator 32. In FIG. 6, graph 46 illustrates position Y versus compensated command signal U (in the time domain) for an optimally tuned system. It will be noted that command signal U, which is a function of error E, is substantially free of oscillations. Graph 48 in FIG. 6 illustrates response of a system which is not properly tuned, i.e. wherein α set by resistor 42 (FIG. 5) is not properly set. Modified identifier 44 tunes the α input from resistor 42 to provide a modified constant α', as well as constants $B_1$, $B_2$, to calculator 38. This is accomplished in one embodiment of the invention by counting peaks in the U input signal during a set-up operation and modifying the α input to minimize such peaks. In another embodiment, the length of the U signal curve is measured by time integration during the setup operation, and the α input is internally modified to minimize such length. In all of these embodiments, modified identifier 44 is self-adaptive in set-up and continuous operation.

Figure 7:
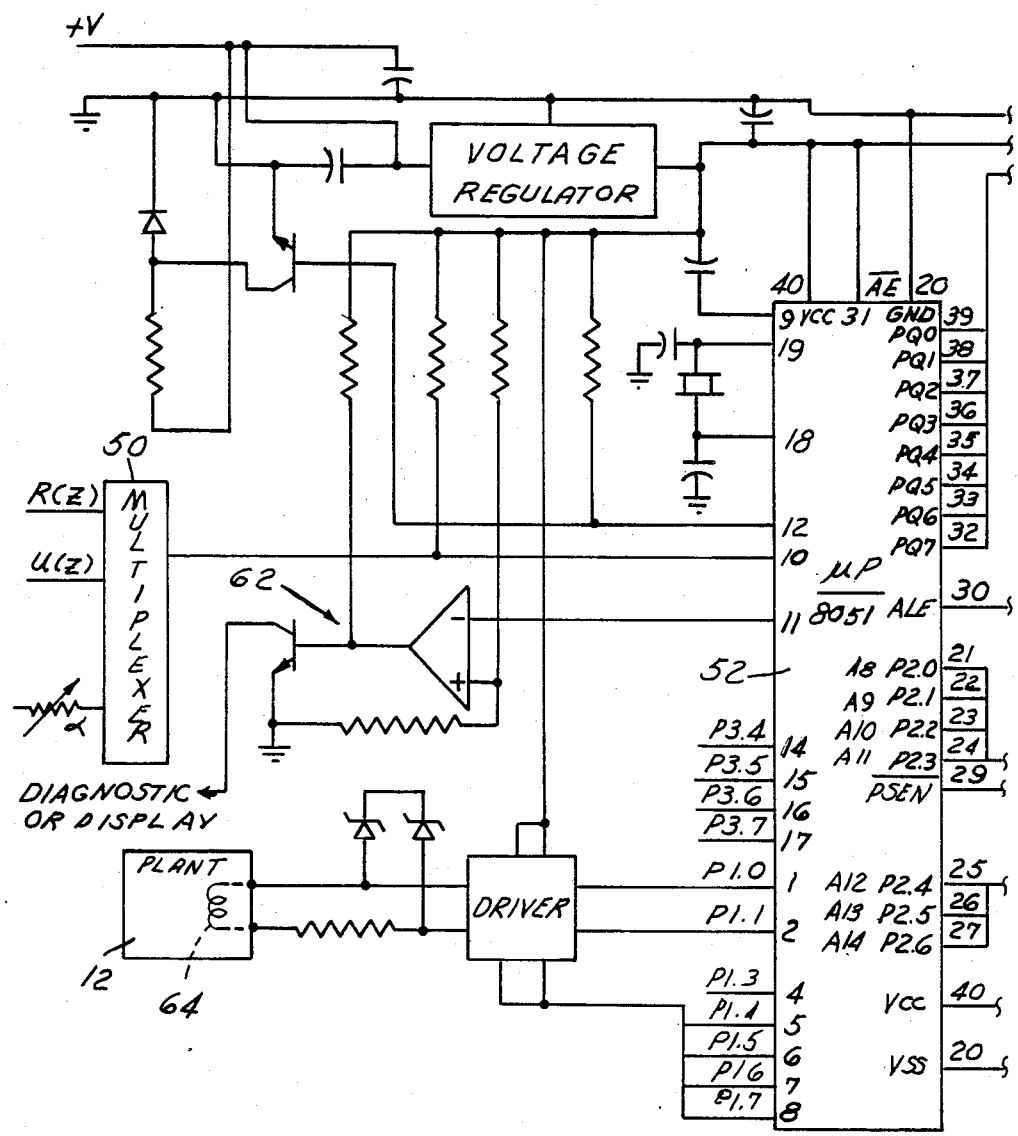
FIG. 7 is an electrical schematic drawing of an electronic controller in accordance with a presently preferred embodiment of the invention.
Figure 7:
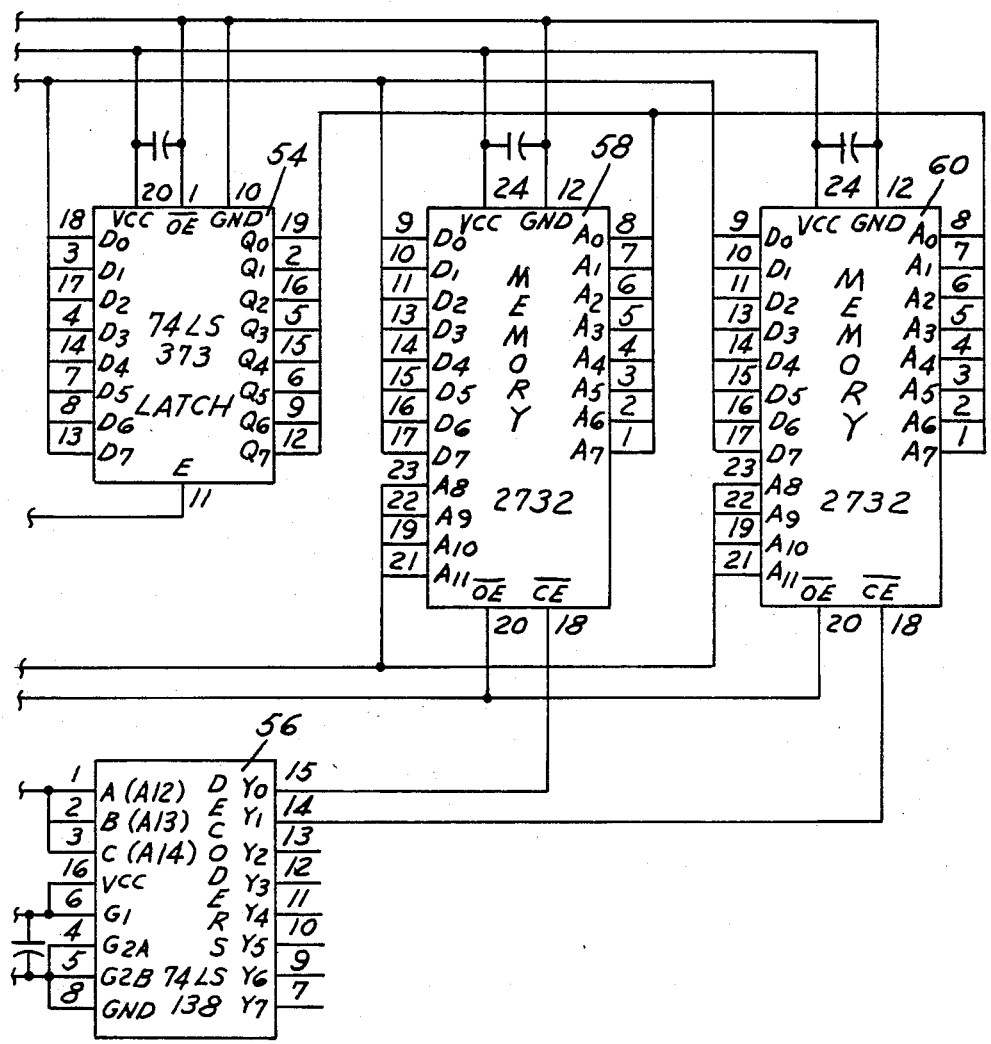

FIG. 7 is an electrical schematic drawing of a presently preferred embodiment of a microprocessor-based electronic controller, and a corresponding computer program in Intel 8051 machine language for implementing the embodiments of FIGS. 4 and 5 (operator selectable) is appended to this specification. The R(Z),U(Z) and α inputs are connected through multiplexer circuitry 50 to a serial input port of an Intel 8051 microprocessor 52. Microprocessor 52, which possesses internal program memory, is connected through a latch 54 and a decoder 56 to a pair of 4K memory modules 58,60. The output port of microprocesor 52 is connected through an amplifier 62 to the valve actuator coil 64 of plant 12. It will be appreciated that identifier 40 (FIG. 4) or 44 (FIG. 5), compensators 28,32, constant calculator 38 and zero order hold circuit 33 illustrated functionally in FIGS. 4 and 5 are all contained within programmed microprocessor 52 and associated memory.

Appendix

```
:02000000214697
:02000B002116BC
:05001B00D290C28E32FC
:100023001099253309A2AC0E0E59065995470701'?AB
:100033008599ICC29D5323F0D218751F0CD29B8542
:100043001799C298D28DD0E032D29DC298D0E032B7
:1000530030180885991D0523C2983220191B8599EC
:100063001C301A0D201B05C29B8518990523C298C5
:10007300328519990523C2983285991EC298C0E02A
:10008300C0D0E51CA2E79210C2E7251D251EA2D011
:100093009 2E0652230E0090516D29DD0D0D0E0323F
:1000A300E51C64605460604BE51C20E02FE51E03F3
:1000B3000354 3FF50EE51D0303F50D530D3F54C0E7
:1000C300420EE523540C6002D217E5230523052 3D2
:1000D3005 3230F54F04223D0D0D0E032E51E030364
:1000E300543FF50CE51D0303F50B530B3F54C0427E
:1000F3000C80CFE51C541F232424C9A71D09A71E68
:100103 00C9E5230523052353230F54F04 223D0D0FD
:100113 00D0E032D51F07751F01D21 38002C2135 3DB
:1001230088AF758CFB758A6185148D85158B438823
:10013300509211A292C2909212A2113256494 34B8D
:10014300455253758 16F7598B075891153B8E04 363
:10015300B80A4387 8075B0FF7590FF787F7600D823
:10016300FCD21578A276050876460 8762B78A57614
:10017300060876C50876FC78AA76050876460876DA
:10018300C178B576030876D308766E78AD76030822
:10019300764A0876D778B276010876DB0876517509
:1001A3005EFC755F7175600 7514FD7515A874FBB1
:1001B30075F061758A61758CFB7115FAABF07C99EA
:1001C300712 58A108B1153A86043A89A21D94C45F5
:1001D300454D485549 53E5557010D50FF9B2B280D6
:1001E300F5454C2D4942494152591017088 0FB549B
:1001F30041504C494E2013 02B29130321 17D007EA2
:1002 0300007F00850D0885 0E0953 0A0F8 00F3033D8
:10021 3 0009120D2B800752 4F44451208931 20CC547
:1002 23001202A212 0DEBC2B4120A79120854D50FAE
:1002 33 0002B2B2E523C4540723D29790024273411A
```

```
:10024300524158415E4164416D4176417941881282
:10025300035A02029712042E02029712050FF0202AA
:10026300971206CF12076D0202971207E312056475
:100273000202970202972037092854C5E854D5F7510
:10028300600002029730037FA120AB0120ACB020258
:10029300974B4159C29721ED342F31352F3835E52E
:1002A300108511F0C313C5F013C5F0C313C5F013C4
:1002B3002461C5F034FB7115FCADF0AB13AA121227
:1002C300032BECC4FD540FFCEBC4FB54F02CFCEDEE
:1002D30033E43CFCF5F0E43B540FFB200B027115B7
:1002E300FCADF074FB75F061D313C5F0132DC5F0AD
:1002F3003CC5F02525C5F0302F0634FF800433318B
:10030300340053A87FF51485F01543A88022524981
:100313004348C5F0F42401C5F0F434002259454B9C
:100323004941E4FFFEFD613DEB8DF0A4FFAEF0EA31
:100333008DF0A42EFEE5F03400FDECBBF0A42EFE30
:10034300E5F03DFDE433CC8AF0A42DFDE5F03CFA65
:10035300EDFBEEFCEFFD22AA5E535F7FAB5FAC606B
:100363007D007E4C7FCD121000300F068D5E8E5FB8
:100373008F607D037E607F00AA5EE55FB2E7FBAC22
:100383006012104E78F7120C98EDA806A9077A05AB
:100393007B607C001211FBAD02AE03AF0412127737
:1003A300EEB2E7FE7A047B607C0012104EEDA806E5
:1003B300A907FAAB06AC071211FB74FE7855795501
:1003C3001211FBAD5EAE5FAF6012104E786D120C72
:1003D30098EEB2E7FE7A067B507C0012104E786DE1
:1003E300120C66EDA806A9071211FB900B3D120C27
:1003F300121211FB78FA120C8F786D120C6FEEB299
:10040300E7FE7A057B507C0012104E786D120C6665
:10041300EDA806A9071211FB900B3D120C12121145
:10042300FBEA2403FA78FD120C8F22900B28120C9E
:100433004AE55EA85FA960FAAB5FAC601211FB7876
:100443006D120C8F12104EAA5EE55FB2E7FBAC6033
:1004530090B2B120C121211FB12104E78E1120C9E
:100463009B7A057B407C00900B25120C4A12104EA3
:10047300786D120C66EEB2E7F8EDA9071211FB9046
:100483000B2E120C4A12104E786D120C66E55EA804
:100493005FA9601211FB78E7120C8F12104E900BBC
:1004A3003120C12AA5EAB5FAC601211FB12104E3C
:1004B30078E4120C987A047B707C00900B25120C64
:1004C3004A12104E786D120C66EDA806A907121198
:1004D300FB900B34120C4A12104E78E7120C66EBA9
:1004E300B2E7FB12104E900B37120C2EEBB2E7FB68
:1004F300E55EA85FA9601211FB12104E78E7120C9B
:100503009878FA120C6678BA120C8F78BD120C8F99
:10051300078C2120C8F78C5120C8F78FD79DD120C1E
:100523008478FA120C6678F7120C781211FB786D46
:10053300120C8F78FD120C6F12104E78D1120C989A
:1005430078D4120C9878D120C6FEEB2E7FE78FA3D
:10055300120C6612104E78D7120C9878DA120C9897
:100563002278EA79A2120C8478ED79A5120C8478AA
:10057300F179AA120C847A047B507C00900B25122B
:100583000C4A12104EAA05EEB2E7FBAC07E55EA8D3
:100593005FA9601211FB900B3A120C4A12104EE540
:1005A3005EA85FA960FAAB5FAC601211FB12104E3C
:1005B30078FA120C66EBB2E7FB78A2120C781211F0
```

```
:1005C300FB12104E78AD120C98900B22120C4AEECF
:1005D300B2E7FE78AA120C6678FA120C781211FBB5
:1005E30012104E78B2120C98900B25120C4A78F721
:1005F300120C6612104E78B5120C98227BC5120CA4
:1006030006678DD120C781211FBAD02AE03AF0478ED
:10061300DA120C6678C2120C781211FBEBB2E7FB0C
:1006230012104E78EA120C9878C5120C6678D7121D
:100633000C781211FBAD02AE03AF0478DA120C662C
:1006430078D4120C781211FBEBB2E7FB12104E7840
:10065300ED120C9878C2120C6678D7120C7812112E
:10066300FBAD02AE03AF0478DD120C6678D4120C36
:100673000781211FBEBB2E7FB12104E78F1120C98D3
:1006830078EA120C6678BA120C781211FBAD02AE3E
:1006930003AF0478ED120C6678BD120C781211FBCF
:1006A300EBB2E7FB12104E78F1120C6678D1120C04
:1006B300781211FB12104EAA05AB06AC071214B246
:1006C30078F4120C8F2244554E43414E78C5120CD8
:1006D300667BE4120C781211FBAD02AE03AF047816
:1006E300DA120C6678E7120C781211FBEBB2E7FB17
:1006F30012104E786D120C9878C2120C6678E412C0
:100703000C781211FBAD02AE03AF0478DD120C6658
:1007130078E7120C781211FBEBB2E7FB12104E785C
:10072300D1120C66E505AB06A9071211FBAD02AEAE
:1007330003AF04786D120C6678BD120C781211FBAE
:10074300EBB2E7FB12104E78EA120C6678E1120C5A
:10075300781211FB12104E78F4120C66EDA806A95C
:1007630071211FB78EA120C8F2278E7120C6678D5
:10077300D7120C781211FBAD02AE03AF0478E4126A
:100783000C6678D4120C781211FBEBB2E7FB121053
:100793004E786D120C66786D120C9878BA120C783C
:1007A3001211FBAD02AE03AF0478ED120C6678E1D3
:1007B300120C781211FBEBB2E7FB12104E786D129C
:1007C3000C6678D1120C781211FB12104E78F412C9
:1007D3000C66EDA806A9071211FB78ED120C8F2207
:1007E30078E7120C6678DD120C781211FBAD02AEBD
:1007F30003AF0478E4120C6678C2120C781211FB72
:10080300EBB2E7FB12104E78BA120C66EDA806A9FC
:1008130071211FBAD02AE03AF04786D120C6678BC
:10082300BD120C781211FBEBB2E7FB12104E78F1FC
:100833000C6678E1120C781211FB12104E78F448
:10084300120C66EDA806A9071211FB78F1120C8FA2
:10085300227867796A120C847864796712OC847B39
:1008630061120C66EBB2E7FB7864120C8F789AE6A0
:10087300789CF6789BE6789DF67895E6789AF678F4
:10088300096E6789BF6E5D7895F6E50E7896F622D2
:10089300120D517895E6FE08E6FF7D10E50BB2E7F1
:1008A300FBAC0C7A1012104E78A2120C66EDA8065F
:1008B300A9071211FB7884120C8F789AE6FE08E6DA
:1008C300FF7D10E50BB2E7FBAC0C7A1012104E78EB
:1008D300A5120C66EDA806A9071211FB7884120C69
:1008E3006F12104E7884120C98789CE6FE08E6FF8F
:1008F3007D10E50BB2E7FBAC0C7A1012104E78AA10
:10090300120C66EDA806A9071211FB7884120C6F6E
:1009130012104EAA4EAB4F7C00EDA806A907121188
:10092300FBAD02AE03AF047864120C6678B5120C0B
:100933000781211FB12104E7867120C6678AD120C08
```

:10094300781211FB12104E786A120C6678B2120CF0
:10095300781211FB12104E225649434B45525378DD
:100963009AE6FE08E6FF7D107895E6B2E7FB08E617
:10097300FC7A1012104E78BA120C98AA64AB65ACCC
:1009830066AD6AAE6BAF6C12104EEEB2E7FE78BD89
:10099300120C98AA67E568B2E7FBAC6978D1120C30
:1009A3008F7D10E50DB2E7FEAF0E789CE6FB08E6FF
:1009B300FC7A1012104E78E1120C9822789AE6FE17
:1009C30008E6FF7D107895E6B2E7FB08E6FC7A10AF
:1009D30012104E78D7120C98AA64AB65AC66AD6A58
:1009E300AE6BAF6C12104EEEB2E7FE78DD120C98D0
:1009F300AA67E568B2E7FBAC6978DA120C8F7D1061
:100A0300E50DB2E7FEAF0E789CE6FB08E6FC7A1034
:100A130012104E78E4120C9822789AE6FE08E6FF4C
:100A23007D107895E6B2E7FB08E6FC7A1012104ECB
:100A330078D4120C98AA64AB65AC66AD6AAE6BAFA2
:100A43006C12104EEEB2E7FE78C2120C98AA67E55C
:100A530068B2E7FBAC6978C5120C8F7D10E50DB267
:100A6300E7FEAF0E789CE6FB08E6FC7A1012104E08
:100A730078E7120C9822AA4AAB4B7C00AD61AE62B8
:100A8300AF6312144878B4120C98AD64AE65AF66FB
:100A9300121448788412 0C6612104EEEC2E7FEAAB6
:100AA3001AAB1B7C0012104E8D1A8E1B22301F10A6
:100AB300E51A7891F6E51B7892F6751A00751B0016
:100AC30022415849533 23841301F117891120C6634
:100AD300AD54AE557F00121000200F0122E552A83D
:100AE300537900121 1FBAD56AE577F0012104EAA78
:100AF3005EAB5FAC6012104EAA46AB477C0012108F
:100B030000030 0F088A5E8B5F75600022AA48AB49EC
:100B13007C00121000300FEC8D5E8E5F8F60220020
:100B2300783404D4A3F957AFFF5C16FAD9D700631E
:100B3300DCF95C1AFF6BA3027289F368DC006815A9
:100B430004D2A1FA528FFF7C12FBD4F5014445FA7B
:100B53005775004A810267A6F368DC005A2004D067
:100B6300ABFB4623004F6DFCC87D0158AFFB4AFB2E
:100B7300 0061F1025DD5F368DC004E0904CEC1FBD0
:100B83006E5E0061F3FCF28B016EEDFB76FC007B85
:100B9300EB025505F368DC00439204CCE3FC51E919
:100BA30000755DFDD55E024364FC5914014C1902C6
:100BB3004D27F368DCFF750504CB11FC740C01446D
:100BC300BDFDF972025006FC7F4A015B5002462CC0
:100BD300F368DCFF655304C949FD4F27014F0EFE3F
:100BE300D32C025D47FD578C016B80024006F368EE
:100BF300DCFF57BC04C78CFD68A7015990FEEE6665
:100C0300026B12FD74B4017C94017552F368DCE548
:100C130030540775F01EA42582F58250020583E443
:100C2300 93F9740193F8740293C922E53 05407755C
:100C3300F01EA42582F58250020583E493FA740121
:100C430093FB740293FC22E530540775F01EA42530
:100C530082F58250020583E493FD740193FE7402CE
:100C630093FF22E6FA08E6FB08E6FC22E6FD08E627
:100C7300FE08E6FF22E6F908E6F5008E6C9A8F063
:100C830022E6F70809E6F70809E6F722EAF608EB91
:100C93000F608ECF622EDF608EEF608EFF622E0FA97
:100CA300A3E0FBA3E0FC22E0FDA3E0FEA3E0FF2220
:100CB300EAF0A3EBF0A3ECF022EDF0A3EEF0A3EF48

```
:100CC300F022AA50AB517C00121448ED24FE30E709
:100CD300067D007E007F008D618E628F6330340B52
:100CE300121277E56230E7034306B030351AE56276
:100CF30030E7158D028E038F04E55AA85B79001245
:100D030011FB8A058B068C07303615E5626011C32B
:100D130030E701D3E55992E7FBAA587C0012104E45
:100D2300121BF38E128F1322D208203102C208E568
:100D3300027540F0475F00FA430300A8527F0C5F04F
:100D4300C4540F04A47D14AEF0FF12118922E528C8
:100D53007014850B08850C09750A00E524540F707F
:100D6300027401F52022120DDC4037E52454F070A3
:100D7300027410B528005006D52005752001E5281A
:100D830075F080A4250AF50AE5F03509F509E508AB
:100D93003400F50840BC120DDC40B785080B85090B
:100DA3000C22E52454F070027410B528005006D5C7
:100DB30020057520O1E52875F080A4F4D3350AF5E4
:100DC3000AE5F0F43509F509E50834FFF5084002B2
:100DD3008080120DDC40C4A155C20DE50BB508079B
:100DE300E50CB50902D20D22E523241053230F5439
:100DF300F04223543OC4F5F0242CF8E6F8E620F151
:100E030019FD08E6FE08E6FFE52A20F002E52912AF
:100E13000E5985061B850719801EF51808E6F51979
:100E2300E52B20F001C4540F600EF8E519C333F528
:100E330019E51833F518D8F3E5F023F8E590547065
:100E4300C475F008A428F5F025182519A2D092F747
:100E530085F017D2B42210E70A2D244030E7107D25
:100E63003F800FF4042D244030E7047DC080032429
:100E7300C0FD1213F3EE54F8600D200B057EFF7FC7
:100E8300F0227E007F0022EF300B08F4FFEEF42403
:100E93000880O624FFFFEE3407C4FEEFC4FF540F9F
:070EA30042065307F0220094
:10100000C20FEB6030EE6037EB10E725EE10E71E05
:10101000C20FED2480F5F0EA2480B5F00F8EF0EBDE
:10102000B5F0098FF0ECB5F003C20F224002B20F09
:1010300022B20F80DDEE70012230E702D20F22EBE8
:1010400020E702D20F224C45454D48554953EB103D
:101050000E7164C6050C208D209EE10E7224F604DEF
:10106000B209EAB5055401B7FB4C6039D208C209C0
:10107000EE10E70B4F6036EAB209B5053D0187FE79
:101080004F602AEAB50533EC2009072FFFEE3BFE3F
:10109000218A9FFFEB9E50F7CFF42401CFF4340058
:1010A000B208FE218AEE10E70CC208218AAD02AE1A
:1010B0003AF042189D208FE218A6D20E70B10D7E7
:1010C00004EA9D2124ED9A01CF4056EAF4D33D7500
:1010D000F004846038C20A20F00330F102D20AB46E
:1010E0001117904EBD754F0C4CCC4CC200A1FFB07
:1010F000C30187B40208E4CB200A71FC0188B40361
:1011000019E47803D6E4CBC4200A610188EBC31349
:10111000CC13CCD5F0F8FBC3018730096CB20821A1
:1011200089EDF43AAD0275F004846047C20A20F0FC
:10113000330F102D20AB401117907EED754F0C49A
:10114000CFC4CF200A2FFEC30187B40208E4CE200B
:10115000A2FFF0187B4030DE47806D6E4CEC4203D
:10116000A1FFF0187AE03AF042189C313D5F0FB2B
:10117000C30188EEC313CF13CFD5F0F8FEC30187A8
:10118000C313D5F0FBFFC30187EEC3600C54F060BE
```

:1011900018EE54C0B4402021C14F603354F0603287
:1011A000EFCEFFED940BFD2191EF7806D6C4CEC4B2
:1011B000FFED9404FD219110D722EE13FEEF13FFF3
:1011C0000DED20E62420E72C3008034306B0227D25
:1011D0000022EECFC4FEED940CFD2191EF33FFEE23
:1011E00033FE1D20E6DBC321DC20E7DC7D3F7E7F74
:1011F0007FFF21C87D007E007F00222A14FAECC305
:1012000033FC920A89F0A430E70205F0E5F089F09A
:10121000F9EBC20810E702B208A20A33FBA429F9CD
:10122000E5F03400CC88F010F702B208A8F0A42949
:10123000F9E5F03CC8920A8BF0A428FCE5F03400F4
:10124000A20A340030E60FFBEA20E61920E721303D
:1012500080343038022C933EC33FCE9331A70E7F7
:101260007A007B002220E7E77A3F7B7F7CFF80DFEC
:101270007A007B007C0022EDD320E701C31304CD6C
:1012800020E02EEE6028547F24E0FE90139093F52A
:10129000F0EFA430E701D3EE23FE9012D093CE20DE
:1012A000E70330E618049335F0FF50010E227D006D
:1012B00022EE60FA547FC313CF13CF4188049335D5
:1012C000F040062FFF50E60E220E2FFF50DF0E22B9
:1012D0005AB25BEA5D4C5EA860006153E2A163ECD8
:1012E0006531667367B168EB6A226B556C846DB1CA
:1012F0006EDA7000712372437361747B759376A903
:1013000077BC78CC79DA7AE67BEF7CF77DFC7EFFE0
:10131000400408040FE417C41F8427442EF436906
:1013200043E2445A44D2454845BE463346A7471B8C
:10133000478E4800487148E2495249C24A304A9EA5
:101340004B0C4B794BE54C514CBC4D264D904DF917
:101350004E624ECA4F324F995000506650CC5131B8
:10136000519651FA525D52C15323538653E8544962
:1013700054AA550B556B55CA562A568956E75745F8
:101380005A35800585D5BB95916597159CD5A2864
:101390006B625C5B534E4B45423E3A37332F2D29F5
:1013A0002623201E1A181613100E0C090B05030117
:1013B000807E7E7C7B7A79787876767574747339F
:1013C00072717170706E6E6E6D6C6C6B6A6A696949
:1013D00068686767666665656463636362626161C5
:1013E0006160605F605F5E5E5E5D5D5C5D5B5C5B5A25
:1013F0004D454CEE10E70EC20BED24EFF4B40E0A8F
:101400007E007F0122D20BFE61F94017B4FF07EF87
:1014100033FFEE33FE2220E7057E007F00227EFFB1
:101420007FFF22B40805AF067E0022400C24F8FDA1
:10143000EE7E00C313DDFCFF22B4000122FDEEC3EB
:1014400013CF13CFDDF9FE22BB00077D007E007FA6
:101450000022BE000122ED2480F5F0EA2480B5F0E0
:101460001B53037FEE10E72BB5030AEFB5040122F2
:1014700040FD8C072240F88B068C072250F18A052C
:101480008C07EE8B0620E70453067F22430680225A
:10149000B5030DEF430680B504012240FD8C072201
:1014A000400BBB064306B08C07224306B0224C416D
:1014B000454CEAF4240430E60520E702743FFAEBD9
:1014C00070037A0022D20B10E702C20890154D245A
:1014D000C0F5F02393FBE5F0230493CCC5F0B41BD7
:1014E000000920990150D93ABF0A433E5F034003074
:1014F00009012850011BF4D33CFCEB34FF30E70713
:101500007400ABA40011AA20892E7FB22F8E9DA0D

```
:10151000CDBEB3A69A8F847A70665D554C433C3439
:101520002D261F18120C0500FBF5F0EBE6E1DCD9C7
:101530000D3D0CCC7C4C0BDB8B6B2AFACABA6A3A028
:101540009D9B9B9593908E8C9B8B5838180007E61
:1015500087C1F7A45787876BA7507736171C77011
:10156000386EB46D3A6BCA6A64690767B2666665BD
:101570002363E762B3618660605F415E295D175C4B
:10158000B5B065A06590B58165726563B555554B1
:1015900074539852BF51EC511C50504F894EC54E58
:1015A00054D484C904BDA4B284A7949CD4925489E
:1015B0007F47DC473C469F4604456C44D744444340
:1015C000B44326429A42114189410440815 2494321
:0415D00048455900 31
:00000001FF
```

The invention claimed is:

1. A power servo system which includes actuator means adapted to variably actuate a load, said actuator means having a predetermined first polynomial transfer function in the sampled-data domain having a plurality of first constants related to dynamic behavior characteristics at said actuator means, and sampled-data servo control means including means for receiving a command signal, sensor means responsive to said actuator means for providing a sensor signal as a function of actuation at said actuator means, and means for providing an error signal to control said actuator means as a combined function of said command signal and said sensor signal to obtain a preselected response characteristic at said actuator means, characterized in that said means for providing said error signal comprises means for periodically sampling said sensor signal to provide a sampled sensor signal, feedback compensation means receiving said sampled sensor signal and having a preselected second transfer function coordinated with said first transfer function to obtain said preselected response characteristics, said second transfer function in the sampled-data domain being a polynomial having a number of second constants which vary at functions of said first constants, means responsive to said feedback compensation means and to said command signal to provide said error signal, means for providing a signal indicative of actuation at said actuator means, and means coupled to said feedback compensation means and responsive to said actuation signal over a number of sampling intervals for providing said second constants as a continuing function of actuation at said actuator means.

2. The system set forth in claim 1 wherein said means coupled to said feedback compensation means includes first means responsive to said actuation signal for estimating with first constants, and second means coupled to said first means for calculating said second constants as a function of estimated first constants.

3. The system set forth in claim 2 wherein said first means includes means for receiving said error signal and said sampled sensor signal, and means for estimating said first constants as a combined function of said error and sampled sensor signals.

4. The system set forth in claim 2 wherein said first means includes means for receiving an input signal indicative of one of said first constants, and means for estimating the remainder of said first constants as a combined function of said actuator signal and said one of said first constants.

5. The system set forth in claim 4 wherein said actuator signal comprises said error signal.

6. The system set forth in claim 2 further comprising series compensation means responsive to said error signal to provide a drive signal to said actuator means, said series compensation means having a third transfer function which in the sampled-data domain is a polynomial having a number of third constants which vary as functions of said first constants, and third means coupled to said first means for calculating said second constants as a function of said estimated first constants.

7. The system set forth in claim 6 wherein said first transfer function is a polynomial of order N in the sampled-data domain, wherein said second transfer function is a polynomial of order N-1 in the sampled-data domain and said third transfer function is a polynomial of order not greater than N in the sampled-data domain, with N being an integer greater than one.

8. A power servo system which includes actuator means adapted to variably actuate a load, said actuator means having a predetermined first polynomial transfer function in the sampled data domain, sampled-data servo control means including means for receiving an actuator command signal, sensor means responsive to said actuator means for providing a sensor signal as a function of actuation at said actuator means, and means for providing an error signal to control said actuator means as a combined function of said command signal and said sensor signal to obtain a preselected response characteristic at said actuator means, characterized in that said means for providing said error signal comprises means for periodically sampling said sensor signal to provide a sampled sensor signal, feedback compensation means receiving said sampled sensor signal and having a preselected second transfer function coordinated with said first transfer function to obtain said preselected response characteristic, said second transfer function being a polynomial in the sampled-data domain having a plurality of second constants which vary as a function of said first constants, means responsive to said feedback compensation means and to said command signal to provide said error signal, first means for receiving an input signal indicative of one of said first constants, second means responsive to said input signal for estimating the remainder of said first constants, and third means coupled to said feedback compensation means and to said first and second means for calculating said second constants based upon said first constants.

9. The system set forth in claim 8 further comprising means for providing a signal indicative of actuation at said actuator means, and wherein said second means comprises means for estimating said remainder of said first constants as a combined function of said actuator signal and said one of said first constants.

10. The system set forth in claim 9 wherein said first means includes means responsive to said input signal for estimating said one of said first constants, and means responsive to said actuator signal for revising said estimated one of said first constants as a function of actuation at said actuator means.

11. The system set forth in claim 8 further comprising series compensation means responsive to said error signal to provide a drive signal to said actuator means, said series compensation means having a preselected third transfer function which in the sampled-data domain is a polynomial coordinated with said first and second transfer functions to obtain said preselected response characteristic and having a number of third constants which vary as functions of said first constants, and third means coupled to said first means for calculating said second constants as a function of said first constants.

12. The system set forth in claim 11 wherein said first transfer function is a polynomial of order N in the sampled data domain, wherein said second transfer function is a polynomial or order N−1 in the sampled-data domain and said third transfer function is a polynomial of order not greater than N in the sampled-data domain, with N being an integer greater than one.

13. A power servo system which includes actuator means adapted to variably actuate a load, said actuator means having a predetermined first polynomial transfer function in the sampled-data domain having a plurality of first constants related to dynamic behavior characteristics at said actuator means, and sampled-data servo control means including means for receiving a command signal, sensor means responsive to said actuator means for providing a sensor signal as a function of actuation at said actuator means, and means for providing an error signal to control said actuator means as a combined function of said command signal and said sensor signal to obtain a preselected response characteristic at said actuator means, characterized in that said means for providing said error signal comprises means for periodically sampling said sensor signal to provide a sampled sensor signal, feedback compensation means receiving said sampled sensor signal and having a preselected second transfer function coordinated with said first transfer function to obtain said preselected response characteristics, said second transfer function in the sampled-data domain being a polynomial having a number of second constants which vary as functions of said first constants, first means for estimating said first constants, second means responsive to said first means and coupled to said feedback compensation means for calculating said second constants as a function of estimated first constants, and means responsive to said feedback compensation means and to said command signals to provide said error signal.

14. The system set forth in claim 13 further comprising series compensation means responsive to said error signal to provide a drive signal to said actuator means, said series compensation means having a third transfer function which in the sampled-data domain is a polynomial having a number of third constants which vary as functions of said first constants, and third means coupled to said first means for calculating said third constants as a function of said estimated first constants.

15. The system set forth in claim 14 wherein said first transfer function is a polynomial of order N in the sampled-data domain, wherein said second transfer function is a polynomial of order N−1 in the sampled-data domain and said third transfer function is a polynomial of order not greater than N in the sampled-data domain, with N being an integer greater than one.

16. The system set forth in claim 15 wherein said actuator means is an electrohydraulic actuator in which said first transfer function in the sampled-data domain is given by the expression:

$$\frac{B_1 Z^2 + B_2 Z + B_1}{Z^3 - aZ^2 + aZ - 1}$$

where $B_1$, $B_2$ and are constant functions of plant parameters given by the equations:

$$a = 2\cos\omega T + 1$$

$$B_1 = K_5 \left( T - \frac{\sin\omega T}{\omega} \right)$$

$$B_2 = 2K_5 \left( \frac{\sin\omega T}{\omega} - T\cos\omega T \right)$$

where $K_5$ is a gain constant, T is sampling period, $\omega$ is neutral stability resonant frequency of said actuator means, and Z is the sampled data domain transform variable.

17. The system set forth in claim 16 wherein said second transfer function is given by the expression:

$$G_1 Z^2 + G_2 Z + G_3$$

and wherein said third transfer function is given by the expression:

$$\frac{1}{Z^3 + C_1 Z^2 + C_2 Z + C_3}$$

where $G_1, G_2, G_3, C_1, C_2, C_3$ are constants related to said constants $a$, $B_1$ and $B_2$ by the expression:

$$C_1 = a - 6e^{-aT}$$

-continued $$\begin{bmatrix} 0 & 0 & B_1 & 0 & -1 \\ 0 & B_1 & B_2 & -1 & \alpha \\ B_1 & B_2 & B_1 & \alpha & -\alpha \\ B_2 & B_1 & 0 & -\alpha & 1 \\ B_1 & 0 & 0 & 1 & 0 \end{bmatrix} \begin{bmatrix} G_1 \\ G_2 \\ G_3 \\ C_2 \\ C_3 \end{bmatrix} =$$

$$\begin{bmatrix} e^{-6aT} \\ -6e^{-5aT} \\ \alpha - 6e^{-aT} + 15e^{-4aT} \\ 1 - \alpha^2 + 6\alpha e^{-aT} - 20e^{-3aT} \\ \alpha^2 - 6\alpha e^{-aT} - \alpha + 15e^{-2aT} \end{bmatrix}$$

18. The system set forth in claim 17 further comprising means for receiving an input signal indicative of said constant $\alpha$, and means for estimating said constants $B_1, B_2$ from said input signal according to the expression:

$$B_1 = \frac{TY}{6}\left(1 - \frac{Y}{20}\right)$$

$$B_2 = \frac{2TY}{3}\left(1 - \frac{Y}{10}\right)$$

where
$Y = 6 + 2(3\alpha)^{\frac{1}{2}}$.

* * * * *